Nov. 21, 1944.   A. B. WHITE   2,363,372
MEASURING SYSTEM
Filed May 8, 1943
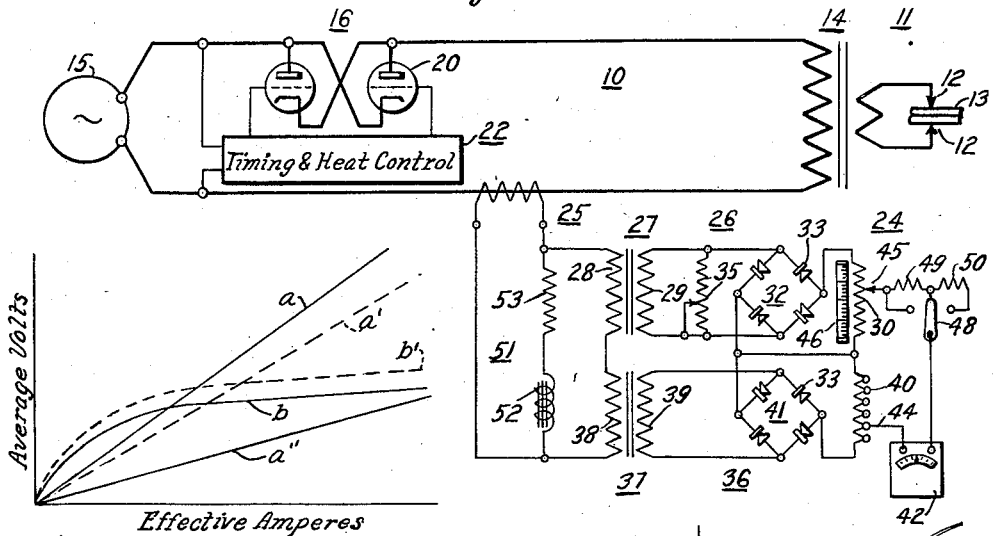
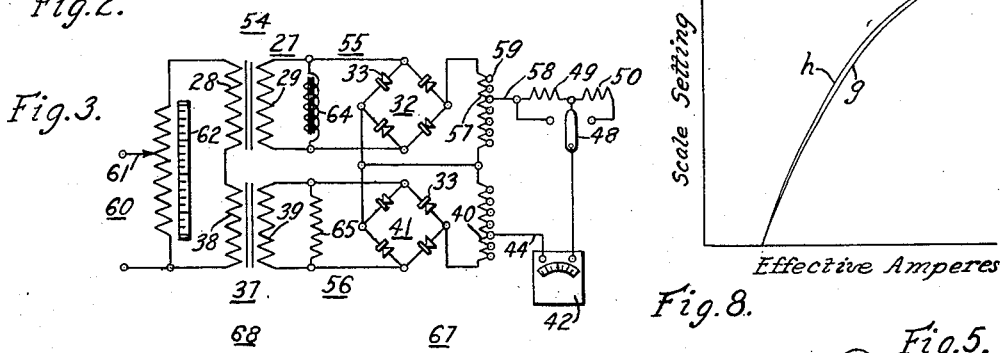
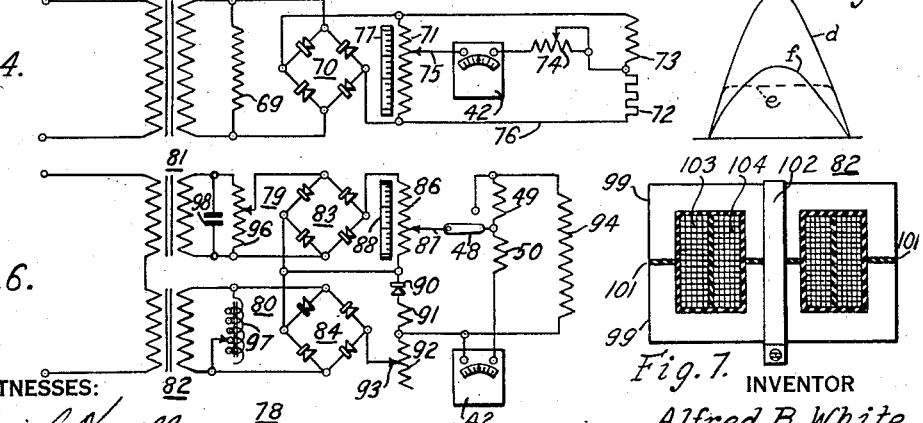
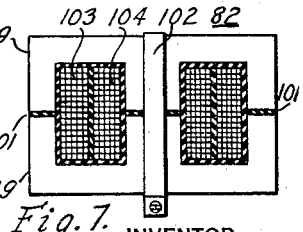
INVENTOR
Alfred B. White.
BY
ATTORNEY Patented Nov. 21, 1944

2,363,372

UNITED STATES PATENT OFFICE 2,363,372

MEASURING SYSTEM

Alfred B. White, Murrysville, Pa., assignor to Westinghouse Electric & Manufacturing Company, East Pittsburgh, Pa., a corporation of Pennsylvania Application May 8, 1943, Serial No. 486,234

16 Claims. (Cl. 171—95)

My invention relates, generally, to measuring systems and it has reference, in particular, to current impulse measuring systems for measuring the values of current impulses of short duration such as are used in resistance welding operations of which spot and seam welding are common examples.

Generally stated, it is an object of my invention to provide a current impulse measuring system or device that is simple and inexpensive to manufacture and is rugged as well as easy to operate.

More specifically, it is an object of my invention to provide for measuring the effective value of one or more impulses of current, such as are used in resistance welding, by producing voltages having different predetermined relations to the values of the current impulses and balancing predetermined rectified portions of said voltages by means of a bridge circuit using a directional current measuring device, whereby the portion of one voltage required to balance a predetermined portion of the other is a measure of the value of a given current impulse.

It is also an object of my invention to provide for measuring the effective values of current impulses in a circuit independently of the number and duration thereof.

Another object of the invention is to provide for using a zero balance bridge type measuring circuit for measuring the effective values of current impulses of relatively short durations in a welding system.

Yet another object of my invention is to provide for balancing voltages produced in substantially linear and non-linear impedances by relatively short impulses of current in a welding system in order to determine the relative values of the current impulses.

A further object of my invention is to provide for measuring the effective values of impulses of current having wave forms which are other than sine waves, and are such as may be produced in welding circuits having heat control.

Other objects will in part be obvious, and will in part be described hereinafter.

In practicing my invention in one of its forms, the current to be measured, or a portion thereof, is passed through substantially linear and non-linear impedances. Voltage divider means are used to apply a variable portion of the voltage drop of one of the impedances to a zero balance type galvanometer circuit in opposition to a fixed portion of the voltage drop of the other impedance. The adjustable control means used to balance the portions of these voltages is calibrated to indicate the effective value of the current impulses for which a balanced condition is obtained.

For a further understanding of the nature and scope of my invention reference may be made to the following detailed description, which may be read in conjunction with the accompanying drawing, in which:

Figure 1 is a diagrammatic view of one embodiment of my invention as it may be applied to a resistance welding system.

Fig. 2 shows a number of curves illustrating the method of obtaining a balance in the current measuring system;

Fig. 3 is a diagrammatic view of the invention in an alternative form;

Fig. 4 is a diagrammatic view of another embodiment of the invention;

Fig. 5 shows a plurality of curves illustrating the method of obtaining a balance in the circuit shown in Fig. 4;

Fig. 6 is a diagrammatic view of a current impulse measuring circuit embodying the invention in another of its forms;

Fig. 7 is a partly sectioned side elevational view of a control transformer such as may be used in the measuring circuit of Fig. 6; and Fig. 8 represents calibration curves of the current measuring system shown in Fig. 6.

Referring to Fig. 1 the reference numeral 10 may denote, generally, a power system such as, for example, a resistance welding system wherein a welding circuit 11, including welding electrodes 12 for engaging work 13 and a welding transformer 14, may be connected to a source of alternating current 15 by switch means 16.

The switch means 16 may be of any suitable type comprising, for example, a pair of inversely connected arc discharge devices 20 provided with suitable timing means for controlling the frequency and duration of the periods of conductivity of the devices, and heat control means for controlling the period of conductivity of the devices in each half cycle during which they conduct. Since the timing and heat control means are well known in the art, no particular details thereof need be shown in this application and they are therefore denoted, generally, by the numeral 22. The timing and heat control means may, for example, be of the types disclosed and described in Patents Nos. 2,275,948 and 2,290,543 issued to J. W. Dawson on March 10 and July 21, 1942, and assigned to the assignee of this application.

In order to provide for measuring the effective values of the different impulses of welding current supplied to the welding circuit 11 by the switch means 16 under different operating conditions of the timing and heat control means, current measuring circuit means 24 may be utilized. For example, a current transformer 25 may be used for providing a connection to the welding system 10 and producing a current proportional to the welding current but of a more suitable value for measuring. In order to produce a control voltage which has a predetermined relation to current impulses of different values, circuit means 26 may be provided. The circuit means 26 may, for example, have a substantially linear relation to the values of the current impulses in the welding circuit. Other relations may be used, and a circuit could be used wherein the relation to the current impulses is non-linear, the voltages being, for example, more than proportionately greater for greater values of impulses, varying as the square thereof, for instance. The circuit 26 may comprise a transformer 27 having a primary winding 28 for connection to the current transformer 25 and a secondary winding 29 disposed to be connected to a suitable voltage dividing impedance such as the resistor 30 through rectifying means comprising a bridge circuit 32 of rectifier devices 33. The transformer 27, resistor 30 and rectifier circuit 32 may comprise the linear voltage circuit if desired, but in order to reduce the load on the rectifier circuit 32, a substantially linear impedance, such as the variable resistance 35, may be connected across the secondary winding 29 of the transformer 27.

In order to provide a control voltage in response to impulses of welding current and varying in a different predetermined relation thereto, being, for example, substantially non-linear with respect to welding current impulses of different values,—substantially constant, or at least less than proportionate values for increasing values of impulses—circuit means 36 may be provided comprising a control transformer 37 having a primary winding 38 connected to the current transformer 25 in series circuit relation with the primary winding 28 of the transformer 27 and a secondary winding 39 connected to a suitable voltage dividing impedance 40 through a bridge circuit 41 of rectifier device 33.

In order to provide a voltage across the impedance 40 which is substantially non-linear in relation to welding current impulses of different values, the transformer 37 may be operated at a sufficiently high flux density so that its core saturates at a relatively low value of current such as, for example, about 20% of the maximum current be measured. Above this value the output voltage of the transformer 37 will remain substantially constant for different values of current impulses.

In order to utilize the voltages produced by the transformers 27 and 37 to indicate the values of the current impulses in the welding circuit, a measuring device such as the microammeter or galvanometer 42 may be connected in bridged relation to the impedances 30 and 40 which are connected across the transformers 27 and 37, respectively, these impedances being so arranged that the voltages thereof are in opposed relation. For example, one terminal of the measuring device 42 may be connected by means of an adjustable tap 44 to the voltage dividing impedance 40 while the other terminal may be connected to the voltage dividing impedance 30 by means of a sliding contact 45. A suitable scale 46 may be provided in connection with the sliding contact 45, which scale may be calibrated to indicate the values of the current impulses in the welding circuit. Means such as the switch 48 and control resistors 49 and 50 may be provided for varying the impedance in the circuit of the measuring device 42, so as to vary the sensitivity thereof.

Referring to Figs. 1 and 2 it will be understood that for any given adjustment of the sliding contact 45 of the impedance 30, the average voltage applied to the measuring device 42 will vary proportionately with the current input to the measuring circuit in a manner such as shown by the solid curve a of Fig. 2. For any given connection of the adjustable tap 44 to the tapped impedance 40, the average voltage applied to the measuring device 42, thereby will vary with the current input to the measuring circuit in a manner such as illustrated by the solid curve b of Fig. 2. For any given value of current impulse input to the measuring circuit 24 the sliding contact 45 may be adjusted to some point for which the voltage applied to the measuring device 42 from the impedance 30 is equal to the voltage applied to the measuring device from the impedance 40 by the given current impulse. At this point the measuring device shows no deflection when the given current is flowing or when no current is flowing, so that a zero balance is obtained. For any other value of current impulse another point must be found on the impedance 30 for obtaining a balance, and the scale 46 may, therefore, be calibrated to read the current at which balance is obtained.

Calibration of the impedance 30 may be readily secured by energizing the welding circuit with a succession of current impulses of known values or by otherwise applying a succession of current impulses to the measuring circuit of known values and of predetermined wave shapes, so that for different values of current impulses, different balancing points may be found on the impedance 30, and the impedance thus calibrated by means of a measuring device such as a thermocouple meter which is capable of reading the effective values of a succession of current impulses.

When thus calibrated the measuring circuit 24 may be readily used to give an accurate indication of the values of single impulses of relatively short duration, to which the usual type of measuring device is unable to respond because of short duration thereof (one half cycle or less), a succession of relatively widely spaced current impulses or a succession of relatively closely spaced impulses, with equal facility. The voltage dividing impedance 40 may also be used for measuring the values of current impulses and may be provided with a scale calibrated for that purpose. In this case a lower setting of the sliding contact 45 should be used, so as to give a flatter curve, such as the curve a of Fig. 2, so that a wider range of intersections with different non-linear curves may be obtained for balancing the circuit.

In order to improve the accuracy of the measuring circuit when measuring tube-controlled currents which may depart from a sine wave, suitable control means 51 may be provided. In the measuring circuit 24 the impedance drop across the transformer 27 is proportional to the average value of the current input. That across the transformer 37 is proportional to the average value of the rate of change of current up to saturation in each half cycle. When the welding current or input current impulses contain harmonics, as is usually the case when arc discharge devices are used to control the welding current, the voltages of the transformers 27 and 37 may vary according to the dotted curves a' and b' of Fig. 2 due to the effects of the harmonics in the welding current. A calibration of the measuring circuit based on a 60 cycle sine wave would, therefore, indicate current values which are low. One method of correcting this effect uses control means 51 comprising an inductance 52 and a resistor 53 connected in series circuit relation across the primary windings of the transformers 27 and 37. This circuit provides a bypass for a portion of the fundamental current wave and thus decreases the fundamental component of the current wave in the measuring circuit, thereby decreasing the slope of curve a and shifting the curve b to the right more in proportion for the fundamental than for the harmonics. By properly proportioning the values of the inductance 52 and the resistor 53, the calibration of the scale 46 may therefore be made to indicate the value of the effective current regardless of the harmonics normally found in tube-controlled welding currents.

Referring to Fig. 3 the reference numeral 54 may denote, generally, a measuring circuit which may be used for measuring welding current impulses in a similar manner to the measuring circuit 24 of Fig. 1. Substantially linear and non-linear circuits 55 and 56 may be provided, comprising, as hereinbefore described, non-saturating and saturating control transformers 27 and 37 having primary windings 28 and 38, respectively, connected to the felding circuit or other circuit in which current impulses are to be measured, and secondary windings 29 and 39 connected to bridge circuits 32 and 41, respectively, of rectifier device 33, which may be connected in opposed relation. A tapped impedance device 40 may be connected across the rectifier circuit 41, and a suitable tapped impedance 57 may be connected across the terminals of the rectifier circuit 32. Connection of the measuring device 42 may be made by means of a tap 44 disposed to be connected to one or another of the taps on the impedance device 40 and a suitable connector 58 which may be arranged for connection to one or another of the taps 59 on the impedance device 57. Means such as the switch 48 and control resistors 49 and 50 may be used as in the circuit 24 of Fig. 1 for varying the sensitivity of the measuring device 42.

Instead of varying the connections of the measuring device 42 to one or another of the impedance devices 40 and 57 in order to balance the voltages produced by the transformers 27 and 37 as in the circuits 24 of Fig. 1, balance may be obtained by varying the input current to the measuring circuit 54. This variation may be secured in a number of different ways, such as by means of a variable impedance shunting the measuring circuit or by means of a variable ratio transformer 60 having, for example, an adjustable tap 61. Means such as the scale 62 may be provided in connection with the tap 61 for indicating the value of the current impulses for which balance is obtained.

In order to correct the calibration of the scale 62 for harmonics in the welding current, means such as the inductance 64 and resistor 65 may be provided in connection with the transformers 27 and 37, respectively. With the proper value of inductance 64, the curve a in Fig. 2 may be made to have approximately the same slope for any value of welding current containing the harmonics normally found therein. Likewise, the proper value of resistor 65 will cause the curve b to be approximately equivalent for any given effective value of current regardless of the harmonics commonly found therein.

The circuits shown in Figs. 1 and 3 embody a saturating transformer 37 as the non-linear impedance. These circuits give quite satisfactory results in most instances, though the current indication may not be exactly the same for welds of extremely short duration such as one or two half cycles or less, as for longer welds lasting for several cycles or more. Corrections may be made in this respect by calibrating the scales for various shapes of current waves and welding times or by changing the impedance of the measuring circuit such as, for example, by changing the adjustment of the impedance 35 in Fig. 1 for different welding times. If desired, the impedance 40 of Fig. 1 could be calibrated for different values of heat control and used in conjunction with the impedance 30. In the system of Fig. 3 either of the impedances 57 or 40 could be calibrated for heat control and used in conjunction with the transformer 60.

The cause of variations of calibration with welding time in the system of Figs. 1 and 3 appears to be primarily the residual magnetism in the core of the saturating transformers. Some correction may thus be obtained by introducing an air gap in the core of these transformers. This difficulty may also be overcome by using other types of non-linear impedances such as, for example, a non-linear resistance (silicon carbide), an electric discharge device, or low pressure gas discharge device. A vacuum tube may also be used as a source of non-linear voltage.

Referring to Fig. 4 the reference numeral 67 may denote, generally, a further modification of the invention wherein a non-linear resistance is used, the resistance of which may decrease with increasing current. A transformer 68 may be used to provide control voltage proportional to the value of the current impulses to be measured and loaded with an impedance such as the resistor 69. A rectifier circuit 70 may be used for rectifying the voltage across the resistor 69. The measuring device 42 may be connected in bridged relation across a parallel circuit comprising a resistor 71 having a linear characteristic, and a parallel path comprising a non-linear resistance 72 and a substantially linear resistance 73 connected in series circuit relation. Means such as the adjustable impedance device 74 may be used for varying the sensitivity of the measuring device 42.

Referring to Fig. 5 the curve d represents the wave form of the voltage across the resistor 71. The voltage across the non-linear resistor 72 may be represented by the dotted curve e. In order to balance the measuring device 42, the adjustable contact member 75 of the resistor 71 may be moved so that the average value of the portion of the voltage between the contact member 75 and the common connection 76 between the linear and non-linear resistors, and which is represented by the solid curve f is equal to the average value of the voltage curve e. For any other value of current impulse a different point must be found on the resistor 71 to balance the portion of the voltage thereof applied to the measuring device 42 against the voltage produced by the non-linear resistor 72, since this resistor has a more or less definite voltage drop. The resistor 71 may, therefore, be provided with a suitable scale 77 which may be calibrated in terms of the impulse current input to the measuring circuit. This circuit gives basically an indication of the peak value of the current impulses measured.

Referring to Fig. 6 the reference numeral 78 may denote, generally, a measuring circuit wherein circuit means 79 and 80 including, for example, the transformers 81 and 82, may be provided for connection to a circuit in which current impulses are to be measured for producing voltages having different predetermined relations to the values of the impulses to be measured. Rectifier circuits 83 and 84 may be connected across the secondary windings of the transformers 81 and 82 and connected together in opposed relation. Means such as the voltage dividing resistor 86 may be connected across the rectifier circuit 83 and provided with an adjustable tap 87 for providing an adjustable unidirectional voltage having a substantially linear relation to the value of the impulses to be measured. A scale 88 may be provided in connection with the adjustable tap 87 for indicating the value of the current impulse to be measured.

In order to provide a voltage having a different predetermined relation to the value of the current impulse to be measured, impedance means such as the junction type rectifier device 90 may be connected across the bridge circuit 84 to provide a substantially non-linear voltage relative to the value of the current impulse to be measured. Control resistors 91 and 92 may be connected in series circuit relation with the rectifier device 90. The resistor 92 may be made adjustable by means of a tap 93 and used as a fine adjustment in calibrating the circuit to measure effective values of current impulses. Decreasing the value of the resistor 92 would have a similar effect to decreasing an air gap in the magnetic circuit of the transformer 82.

The measuring device 42 may be connected in bridged relation across the resistor 91, the non-linear rectifier device 90, and a portion of the resistor 86 for indicating when a balanced point is obtained. Means comprising, for example, a switch 48 and control resistors 49 and 50 may be connected in series circuit relation with the measuring device 42 for varying the impedance of the measuring device circuit so as to vary its sensitivity.

In order to vary the sensitivity of the measuring device 42 without appreciably varying the effective resistance of the bridging circuit connected across the linear and non-linear impedances 86 and 90, an auxiliary control resistor 94 may be connected in shunt relation with the control resistors 49, 50 and the measuring device 42. The values of the resistors 94, 49, and 50 may be so selected that the resistance of the parallel bridging circuit remains substantially constant for different positions of the switch 48. The resistor 94 may, for example, be substantially equal to the sum of the impedances of the resistor 50 and measuring device 42.

In this embodiment of the invention a resistance load may be provided across the secondary winding of the control transformer 81 by means of an adjustable resistor 96, and reactance means such as the variable inductance device 97 may be connected across the secondary winding of the control transformer 82. Under these conditions the measuring circuit operates substantially the same as that described in connection with Fig. 4 except that the impedance drop across the inductance device 97 is proportional to the rate of change of current rather than to the change of current itself and a portion of this impedance drop, namely, that across the resistor 91 is added to the voltage drop across the non-linear resistor 90.

The effect of this arrangement is to peak the average voltage wave of curve e of Fig. 5 more for a current wave shape containing harmonics such as is usually the case with tube controlled welding currents. By proper design, primarily of the ratio between the impedance drops across the resistor 96 and the inductance device 97 and between the voltage drop across the rectifier device 90 and the resistor 91, the scale 88 may be made to indicate the effective value of the current impulses very closely for any wave shape commonly met in welding currents. This result is demonstrated by the curves shown in Fig. 8, where the curve g represents the 60 cycle sine wave calibration curve of the measuring circuit 80, and the curve h is the calibration curve for 28% heat control—the effective value of the delayed firing impulses being 28% of the effective 60 cycle sine wave current without delay.

A similar effect to that produced by the inductance device 97 may be secured by connecting a capacitor 98 across the secondary winding of the control transformer 81 instead of using the inductance device 97. The capacitor 98 tends to flatten the voltage curve f of Fig. 5, which gives a similar result to that produced by the inductance device 97 which tends to peak the voltage curve e. The condenser 98 and inductance 97 may be used separately, or together, if desired. In both cases an effective peaking of the non-linear voltage curve relative to the linear voltage curve is secured.

The inductance device 97 may be replaced by changing the design of the control transformer 82 so as to provide a relatively high magnetizing current. Referring to Fig. 7 it will be seen that the transformer 82 may be modified from the usual closed iron core type so as to comprise a core of substantially E-shaped laminations 99 having air gaps therebetween. The air gaps may, for example, be spaced by means of suitable thicknesses of insulating material 101, and the laminations 99 secured together by clamp means 102, with the primary and secondary windings 103 and 104 secured firmly therebetween.

Before calibrating any of the apparatus described in the above description, the apparatus may be adjusted to indicate the effective value of current for all form factors of current for which the apparatus is to be used. The necessary adjustments have been provided for and described in the above description, and the apparatus described in connection with Fig. 6 may be taken as a typical example. Where the impedance 97 is obtained by introducing an air gap in the core of transformer 82, this impedance may be varied by varying the air gap, thereby introducing a correction proportional to the rate of change of current. Fine adjustments may be obtained by adjusting the value of the control resistor 92.

The adjustments may be made at a current of about 40% of the maximum value of current for which the apparatus is designed, i. e., at about two amperes for a five ampere measuring circuit current. The adjustment may be made so that the galvanometer or measuring device 42 indicates balance at the same point on the dial for a pure 60-cycle sine wave current and for a current which has been reduced to the same effective value from a pure 60-cycle sine wave current of about four times that effective value by delayed firing heat control means such as the electronic heat control denoted generally by the numeral 22.

An example of one procedure for adjustment for harmonics is as follows: Set the air gap in the transformer at an effective total length of approximately .020–.040 inch. Check the scale reading at balance for the two types of current of the same effective value as described above. If the reading for the effective value of the heat controlled impulse is too high, more correction is needed, and the air gap should be shortened or the value of the resistor 92 decreased. Check the scale reading again and readjust air gap or either of the resistors 91 or 92, and so on until the readings are substantially the same for both currents.

The apparatus may now be calibrated for the full current range. Since the circuit of Fig. 6 has been compensated for form factor, it may be calibrated on 60-cycle current. Circuits not compensated, may be calibrated on a current having a form factor equivalent to that of the current to be measured. The calibration should be made against another measuring device of similar current range which is designed to, or which is of a type that will, read effective values of current directly. A thermocouple type of meter is satisfactory. The calibration may be made on a continuous current (or a current consisting of a continuous series of impulses) so that the effect of the mechanical or thermal inertia of the standard or test meter or measuring device is eliminated.

The calibration is made by passing a current through the apparatus and the standard meter or measuring device, adjusting the voltage dividing impedance 86 to bring the needle of the measuring device to balance, and noting the position of the tap 87 of the voltage dividing impedance 86 and the effective value of the current as read on the standard meter or measuring device. This is repeated for a number of different values of current. The scale readings may then be plotted against the corresponding effective values of current and the calibration curve drawn, or the current values may be engraved directly on the voltage divider scale. Typical calibration curves of a measuring circuit such as that of Fig. 6 are shown in Fig. 8, where the curve $g$ represents the calibration on a 60-cycle sine wave, and the curve $h$ represents the calibration on a 28% heat controlled current impulse, wherein the current flow was limited to about ½ of each half cycle so as to have an effective value of about 28%.

While power factor of the current to be measured is not a critical factor, it should be noted that resistance welders operate at a relatively low power factor. The wave shape of heat-controlled currents on very high power factor is radically different from the wave shape on low power factors and would contain many more harmonics which would probably be lost in current transformers used in conjunction with the measuring apparatus. Therefore, the calibration of the apparatus should be made on a relatively low power factor current, say, .3 to .5, such as obtained on resistance welding equipment.

From the above description and the accompanying drawing, it will be apparent that I have provided in a simple and effective manner for measuring the effective values of welding current impulses of such short durations as cannot be normally measured by the usual indicating instruments because of the relatively long time mechanical and/or thermal constants thereof. Since the measuring circuit is of a directional zero balanced type, accurate indications of the values of the welding current impulses may be secured independently of the duration and number of impulses. A measuring device embodying the features of my invention is inexpensive and relatively simple to manufacture. It may be easily applied to welding machines already in use and is simple to operate. Once it has been calibrated on current impulses of predetermined shape and value the operator merely needs to adjust the measuring circuit adjusting means until a balance is obtained, whereupon the value of the current impulse for which balance is obtained may be read from the calibrated scale, or, if desired, the heat control or other current adjusting means of the welding circuit may be adjusted to obtain a zero balance of the measuring device after the measuring circuit adjusting means of the measuring device has been preset for a given value of current as determined by its calibrated scale.

Since certain changes may be made from the above description and different embodiments of the invention may be made without departing from the spirit or scope thereof, it is intended that all the matter contained in the above description and shown in the accompanying drawing shall be considered as illustrative and not in a limiting sense.

I claim as my invention:

1. A weld current measuring system comprising, a control circuit disposed to be connected to a welding circuit for producing a control voltage varying in predetermined relation to different values of weld current pulses, an additional control circuit disposed to be connected to the welding circuit for producing another control voltage varying in a different predetermined relation to said different values of weld current pulses, a measuring device, and circuit means connecting the measuring device in bridging relation to the control circuits in opposed relation including calibrated adjusting means for balancing voltages from the control circuits applied to the measuring device by a given pulse of weld current, whereby the adjustment of the adjusting means is a measure of the effective value of said weld current pulse.

2. Weld current measuring means comprising, a directional measuring device, a control circuit disposed to be connected to a welding circuit for producing a control voltage of predetermined polarity varying in predetermined relation to weld current pulses of different values, an additional control circuit disposed to be connected to the welding circuit for producing a control voltage of predetermined polarity varying in a different predetermined relation to said pulses of weld current, circuit means connecting the measuring device in bridging relation to the control circuits in opposed relation, and adjustable impedance means connected for balancing voltages applied to the measuring device from the control circuits, said impedance means being calibrated in accordance with current pulses of predetermined values, whereby the adjustment thereof at which the voltages applied to the measuring device balance is a measure of the effective value of the current pulse.

3. Weld current measuring means comprising, a measuring device, circuit means producing substantially linear and non-linear voltages, respectively, in different portions of the circuit means in response to a pulse of current, circuit means connecting measuring device to the aforesaid means so as to apply portions of said voltages to the measuring device in opposed relation, and adjustable control means operable to vary the relative values of said portions of the voltages for different values of current pulses so as to balance them against each other, said control means being calibrated on current impulses of predetermined shape and value to indicate the effective value of a current pulse for which a balance condition is obtained.

4. A measuring system for measuring relatively widely spaced current pulses in a circuit comprising, circuit means including substantially linear and non-linear devices connected to the circuit to produce substantially linear and non-linear voltages across said devices respectively in response to a pulse of current in the circuit, sensitive measuring means, circuit means connecting the measuring means to the control means to apply portions of said linear and non-linear voltages to the measuring means in opposed relation, and adjustable control means operable to balance the voltages applied to the measuring means and calibrated on the basis of substantially continuous current impulses of predetermined wave form to indicate the value of a current pulse by the adjustment of the adjusting means necessary to maintain a zero reading on the measuring means during the impulse.

5. A measuring system comprising, control circuit means disposed to be connected to an impulse energized circuit for producing a non-linear voltage comprising the resultant between opposed unidirectional control voltages produced in different portions of the circuit means and varying in different relations for corresponding values of current, a sensitive directional current measuring device, circuit means connecting the current measuring device in bridged relation to the circuit means producing the resultant of the opposed control voltages, adjustable control means operable to vary the relative values of the voltages producing the resultant non-linear voltage applied to the measuring device in order to balance them, and circuit means operable to vary the impedance of the measuring device circuit to vary the sensitivity of the measuring device.

6. A zero balance weld current measuring system comprising, control means disposed to be connected to a welding circuit for producing a voltage varying in predetermined relation to pulses of welding current of different values, additional control means disposed to be connected to the welding circuit for producing a second voltage varying in a different predetermined relation to said pulses of welding current, rectifier means associated with both of the control means for rectifying said voltages, a directional zero balance current measuring device, and voltage divider means connecting the control means in opposed relation with the measuring device in bridged relation thereto, said voltage divider being calibrated on a substantially continuous current impulse basis whereby the calibration reading for zero reading on the measuring device during an impulse is a measure of the current impulse.

7. A zero balance current impulse measuring circuit comprising, a directional current measuring device, means for producing a substantially linear unidirectional voltage in response to a current impulse, means for producing an opposed substantially non-linear unidirectional voltage in response to said pulse of current, and adjustable voltage divider means connecting the directional current measuring device in bridged relation with said means to balance a portion of one voltage against a portion of the other, said divider means being calibrated whereby the reading when the portions of the voltages are balanced is a measure of the current pulse for which the balance is obtained.

8. In a zero balance meter circuit, in combination, transformer means disposed to be connected to a circuit energized by spaced impulses of electrical energy for producing a voltage substantially directly proportional to the energy impulse, saturable transformer means disposed to be connected to the circuit for producing a voltage of non-linear relation with the value of the energy impulse, means to rectify said voltages, circuit means connecting the rectifier means with the voltages in opposed relation, a relatively sensitive directional current measuring device, and means connecting the current measuring device to the circuit means in bridged relation, said means being adjustable for balancing a portion of the voltage from one of the rectifier means against a portion of the voltage from the other and calibrated, whereby the adjustment for balance is a measure of the energy impulse.

9. An impulse measuring circuit comprising, circuit means disposed to be connected to a circuit energized by current impulses of varying wave forms including a pair of impedance devices for producing opposed unidirectional voltages varying in different predetermined relations respectively for current impulses of different values, reactance means associated with said means for minimizing the effect of varying harmonic contents in current impulses of different wave form by effectively reducing the peak values of one of said voltages relative to the other, a galvanometer device, and circuit means connecting the galvanometer device in bridging relation to the impedance means including calibrated control means adjustable to balance a portion of one of the voltages against a fixed portion of the other.

10. A zero balance type current impulse measuring circuit comprising, transformer means disposed to be connected to a circuit energized by current impulses of relatively short duration for producing a voltage having a substantially linear relation to the value of each current impulse, additional transformer means disposed to be connected to said circuit to produce a voltage having a substantially non-linear relation to the value of each current impulse, means to rectify said voltages, a directional current measuring device, means including voltage dividing means connecting the rectifier means in opposed relation to the current measuring device for balancing a predetermined portion of one voltage against a variable portion of the other to indicate the value of the current impulse for which the voltages balance.

11. A current impulse measuring device for measuring current impulses of relatively short duration comprising, circuit means disposed to be connected to a circuit energized by current impulses of relatively short duration for producing a unidirectional voltage proportional to the value of each impulse, means to rectify said voltage, separate impedance means connected to the rectifying means and disposed to produce substantially linear and non-linear voltage drops respectively, current measuring means, circuit means connecting the current measuring means to the impedance means in bridging relation for applying opposed linear and non-linear voltages respectively thereto, and circuit means adjustable to vary the relative values of the linear and non-linear voltages applied to the measuring means so as to balance the linear and non-linear voltages against each other.

12. A zero balance type current measuring device for measuring current impulses of relatively short duration comprising, a plurality of transformer means disposed to be connected to a circuit energized by current impulses of relatively short duration, rectifier means to rectify the output voltages of the transformer means, circuit means connecting the rectifier means in opposed relation, a plurality of voltage divider means connected to the rectifier means including separate impedance means for providing substantially linear and substantially non-linear voltage drops respectively, a zero balance type directional current measuring instrument, and circuit means connecting the current measuring instrument in bridged relation with the voltage divider means, said circuit means including adjustable connecting means for varying the point of connection to one of the voltage divider means for balancing the voltages applied to the current measuring instrument to obtain a zero reading.

13. An impulse measuring device comprising, a pair of transformer means disposed to be connected to an impulse energized circuit, circuit means connected to the transformer means for producing separate substantially linear and substantially non-linear opposed unidirectional voltages, respectively, in response to current impulses in said circuit, means including a reactance device connected to one of the circuit means for causing the voltage wave of the non-linear voltage to be more peaked than that of the linear voltage, directional current measuring means, and circuit means including an adjustable connection to one of the voltage circuits for connecting the current measuring means in bridged relation with said circuits and balancing the voltages applied thereto from the circuits.

14. A current measuring system for measuring the value of current impulses of relatively short duration comprising, circuit means disposed to be connected to a circuit energized by current impulses of relatively short duration for producing opposed unidirectional voltages in different portions of said circuit means having substantially linear and non-linear relations, respectively, to the values of the current impulses, an inductance device connected to the non-linear voltage circuit for increasing the non-linear wave peak relative to the linear wave peak, a galvanometer, and circuit means connecting the galvanometer in bridged relation to the circuit means including an adjustable connection to the linear circuit for balancing a portion of the non-linear circuit voltage therewith.

15. An impulse current measuring circuit comprising, circuit means disposed to be connected to a circuit energized by electrical impulses of relatively short duration and varying wave form for producing separately substantially linear and non-linear voltages, respectively, in response to the impulses, galvanometer means, circuit means connecting the galvanometer means in bridging relation with the circuit means including an adjustable connection for balancing a portion of the linear voltage against a portion of the non-linear voltage, and adjustable impedance means connected in series circuit relation with the galvanometer means for varying the sensitivity thereof and provided with shunt impedance means for maintaining the net impedance of the bridging circuit substantially constant.

16. A measuring system comprising, circuit means including means for producing linear and non-linear voltages in different portions thereof in response to the quantity to be measured, a condenser connected to the circuit means for causing the non-linear voltage to be relatively more peaked by reducing the peak of the linear voltage, means to rectify the voltages, measuring means, and circuit means including an adjustable connection connecting the measuring means in bridged relation to the circuit means so as to apply portions of the linear and non-linear voltages thereto in opposed relation.

ALFRED B. WHITE.